US011376728B2

(12) United States Patent
Mellander et al.

(10) Patent No.: US 11,376,728 B2
(45) Date of Patent: Jul. 5, 2022

(54) METHOD OF HANDLING SAFETY, CONTROL SYSTEM AND INDUSTRIAL SYSTEM

(71) Applicant: ABB Schweiz AG, Baden (CH)

(72) Inventors: Roger Mellander, Västerås (SE); Daniel Wäppling, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/594,257

(22) PCT Filed: Apr. 16, 2019

(86) PCT No.: PCT/EP2019/059726
§ 371 (c)(1),
(2) Date: Oct. 8, 2021

(87) PCT Pub. No.: WO2020/211927
PCT Pub. Date: Oct. 22, 2020

(65) Prior Publication Data
US 2022/0088770 A1  Mar. 24, 2022

(51) Int. Cl.
*B25J 9/00* (2006.01)
*B25J 9/16* (2006.01)

(52) U.S. Cl.
CPC .......... *B25J 9/0084* (2013.01); *B25J 9/1674* (2013.01); *G05B 2219/40202* (2013.01); *G05B 2219/40203* (2013.01)

(58) Field of Classification Search
CPC .................. B25J 9/0084; B25J 9/1674; G05B 2219/40202; G05B 2219/40203
See application file for complete search history.

(56) References Cited

U.S. PATENT DOCUMENTS

| 2005/0052148 | A1  | 3/2005 | Carlson et al. |
| 2008/0125908 | A1  | 5/2008 | Sjöberg |
| 2009/0204261 | A1* | 8/2009 | Strand ...................... B25J 19/06 700/264 |
| 2010/0127824 | A1* | 5/2010 | Moschl .............. G05B 19/4184 345/161 |

(Continued)

OTHER PUBLICATIONS

International Preliminary Report on Patentability; Application No. PCT/EP2019/059726; dated Jul. 7, 2021; 33 Pages.

(Continued)

*Primary Examiner* — Dale Moyer
(74) *Attorney, Agent, or Firm* — Whitmyer IP Group LLC

(57) ABSTRACT

A method of handling safety in a working area of an industrial system, wherein at least one machine is arranged to operate in the working area, at least one manually operable safety input device is provided in the working area, and one or more of the at least one machine and the at least one safety input device is movable to different positions in the working area, the method including continuously or repeatedly determining whether one or more of the at least one the machine is in proximity to one or more of the at least one safety input device; and associating at least one machine with the at least one safety input device upon determining that one or more of the at least one machine is in proximity to one or more of the at least one safety input device, such that the at least one associated machine can be brought to a safe state by means of the at least one safety input device.

17 Claims, 2 Drawing Sheets

(56) References Cited

U.S. PATENT DOCUMENTS

| | | |
|---|---|---|
| 2017/0100838 A1 | 4/2017 | Lewis |
| 2018/0120804 A1 | 5/2018 | Higuchi et al. |
| 2018/0181104 A1 | 6/2018 | Stubbs et al. |
| 2018/0222052 A1 | 8/2018 | Vu et al. |
| 2019/0030717 A1 | 1/2019 | Rublee et al. |

OTHER PUBLICATIONS

International Search Report and Written Opinion of the International Searching Authority; Application No. PCT/EP2019/059726; Completed: Jan. 7, 2020; dated Jan. 15, 2020; 18 Pages.
Chinese First Office Action; Application No. 201980095360.5; dated Feb. 28, 2022; 5 Pages.

\* cited by examiner

METHOD OF HANDLING SAFETY, CONTROL SYSTEM AND INDUSTRIAL SYSTEM

TECHNICAL FIELD

The present disclosure generally relates to handling of safety in industrial environments. In particular, a method of handling safety in a working area of an industrial system, a control system for handling safety in a working area of an industrial system, and an industrial system comprising such control system, are provided.

BACKGROUND

Working areas of machines in industrial systems are commonly fixed and safeguarded with fences and associated safety system to ensure a safe environment for the operators. The trend in the industry is to increase mobility of machines of industrial systems. One example of such industrial system is a factory where some AGVs (automated guided vehicles) move parts between robots and some AGVs move robots between working stations where the parts are to be machined by the robots. The increased mobility of machines (e.g. AGVs and robots) of the industrial system in combination with mobility of one or more operators results in hazards which need to be addressed in order to ensure a safe working environment.

US 2017100838 A1 describes methods and apparatus for operating robotic actors in a human/robotic environment. A safety controller that is configured to communicate with one or more robotic actors can receive actor information about at least a location of one or more robotic actors. The safety controller can generate an output including a command for controlling operation of a particular robotic actor.

US 2008125908 A1 discloses a method for controlling an industrial robot in an area by means of a portable operator control device comprising an emergency stop button. The robot includes an enabling function which upon activation enables an enabling device of the portable operator control device. The enabling function is automatically activated when the operator control device enters the area.

SUMMARY

One object of the present disclosure is to provide a method for handling safety in a working area of an industrial system, which method provides a safer environment for operators in a dynamic working area with at least one mobile machine and/or at least one mobile safety input device.

A further object of the present disclosure is to provide a method for handling safety in a working area of an industrial system, which method provides a dynamic handling of safety in a dynamic working area with at least one mobile machine and/or at least one mobile safety input device.

A still further object of the present disclosure is to provide a method for handling safety in a working area of an industrial system, which method provides a simpler, more flexible and/or more reliable handling of safety in the working area.

A still further object of the present disclosure is to provide a method for handling safety in a working area of an industrial system, which method solves several or all of the foregoing objects in combination.

A still further object of the present disclosure is to provide a control system for handling safety in a working area of an industrial system, which control system solves one, several or all of the foregoing objects.

A still further object of the present disclosure is to provide an industrial system comprising at least one machine and at least one safety input device, which industrial system solves one, several or all of the foregoing objects.

According to one aspect, there is provided a method of handling safety in a working area of an industrial system, wherein a plurality of machines are arranged to operate in the working area, at least one manually operable safety input device is provided in the working area, and one or more of the machines is mobile and movable to different positions in the working area, the method comprising continuously or repeatedly determining whether one or more of the machines is in proximity to one or more of the at least one safety input device; and associating a plurality of machines with at least one safety input device upon determining that a plurality of the machines are in proximity to one or more of the at least one safety input device, such that the plurality of associated machines can be brought to a safe state by means of the at least one safety input device.

By associating a safety input device with a plurality of machines in proximity to the safety input device in this manner, the safety input device will be capable of bringing different sets of machines to their respective safe states, where the set of machines depends on the current position layout of the safety input device and the machines in a dynamic working area. For example, an operator holding a mobile safety input device can walk into proximity of a moving machine such that the mobile safety input device becomes associated with the moving machine. The operator can then walk next to the moving machine and have the possibility to bring the machine to a safe state at any time.

The machines that are currently associated with a safety input device constitute a span of control of the safety input device. When the safety input device and/or the machines move to different positions in the working area, further machines may be associated with the safety input device and/or associated machines may be dissociated from the safety input device, i.e. the span of control of the safety input device may change. Due to the dynamic spans of control provided by the method, dynamically adaptive protective configurations for operators exposed to the industrial system can be provided. Each machine associated with a safety input device may be brought to a safe state by a single human action on the safety input device, e.g. by pressing a button.

The method according to the present disclosure may be used as a complement to existing safety methods. In case any of the existing safety methods fails, or for any other reason, the safety input device may be activated to bring the machines associated with the safety input device to a safe state. For example, in case a machine in the form of an AGV does not slow down as intended when approaching an operator, the operator may activate any of the safety input devices (such as a hand-held safety input device) associated with the AGV in order to mitigate the hazard of the approaching AGV.

Each safety input device of the industrial system may be configured to override other control schemes of the machines, such as other safety functions, in order to bring the associated machine to the safe state. Alternatively, each safety input device may be configured to be used as a complement to other control schemes of the machines, such as other safety functions.

In order to determine whether one or more machines are in proximity to one or more safety input devices, the industrial system may for example comprise various types of sensors. Examples of such sensors include scanners, cameras such as FLIR (forward-looking infrared) cameras, radars, proximity sensors, visible light sensors, light barriers, optical sensors, laser sensors, infrared sensors and/or GPS (Global Positioning System) sensors. One or more sensors may be provided on one or more machines and/or on one or more safety input devices. Such sensors may be referred to as coupled sensors. Alternatively, or in addition, the industrial system may comprise one or more sensors separate from the one or more machines and the one or more safety input devices. Such sensors may be referred to as decoupled sensors. In any case, position data from the sensors may be translated into a common coordinate system in order to determine whether one or more machines are in proximity to one or more safety input devices. The sensors may also be used to determine the positions of one or more operators in the working area. In case mobile safety input devices are employed, the position of the operator may however be approximated with the position of the safety input device, i.e. it may be supposed that an operator holds the mobile safety device unless a certain event is triggered (e.g. if a dead man's switch is activated or if a periodic test pulse is not initiated by a human for a certain time).

The method may for example comprise determining that a machine is in proximity to a safety input device if a distance between the machine and the safety input device is below a certain distance value. The distance value may be static or dynamic. The distance values may be determined based on a hazard level of each machine. In case one or more dynamic distance values are used, the distance values may depend on the type of safety input device, the type of machine and/or on the type of operation carried out by the machine. For example, a larger distance may be set for stationary safety input devices than for mobile safety input devices.

Alternatively, or in addition, a determination whether a machine is in proximity to a safety input device may comprise, or be constituted by, a determination whether a safety input device is within a hazard zone of a machine. A hazard zone may be defined as a zone in which exposure to the machine is possible and for which an operator needs risk mitigation. In case movable machines are employed, there will thus be movable hazard zones in the working area. Additionally, a task zone may be defined around each safety input device. In case there is an overlap between a task zone and a hazard zone, it may be determined that the safety input device is in proximity to the machine and the safety input device may consequentially be associated with the machine.

The definition that one or more of the at least one machine and the at least one safety input device is movable to different positions in the working area, means that at least one machine and/or at least one safety input device is mobile in the working area. Throughout the present disclosure, one or more of the at least one machine may be an industrial robot. Each industrial robot may comprise a manipulator programmable in three or more axes. Further examples of machines according to the present disclosure are AGVs and conveyor belts.

In one example, the industrial system comprises a plurality of machines and at least one safety input device. In a further example, the industrial system comprises a plurality of machines and a plurality of safety input devices. The working area may for example be an area in a factory.

Various types of safe states of the machines are possible. One example of a safe state according to the present disclosure can be achieved by stopping the machine, activating brakes, and removing power to end actuators. An alternative safe state according to the present disclosure can be achieved by limiting the power to the machine.

The method may further comprise estimating whether one or more of the machines will be in proximity to the at least one safety input device within a time limit; and associating at least one machine, that will be in proximity to the at least one safety input device within the time limit, with the at least one safety input device, such that the at least one associated machine can be brought to a safe state by means of the at least one safety input device. For example, one or more machines approaching a safety input device may be associated with the safety input device before the machines are in a defined proximity to the safety input device.

The estimation may be based on a relative speed between the at least one machine and the at least one safety input device. The method may thus further comprise determining a relative speed between at least one machine and at least one safety input device. The relative speed may be measured or estimated.

The method may further comprise determining whether at least one of the associated machines is no longer in proximity to the at least one safety input device; and dissociating the at least one associated machine from the at least one safety input device upon determining that at least one of the associated machines is no longer in proximity to the at least one safety input device, such that the at least one dissociated machine can no longer be brought to a safe state by means of the at least one safety input device.

The method may further comprise determining whether there is an obstructed line of sight between the at least one safety input device and one or more of the machines; and dissociating at least one associated machine from the at least one safety input device, or refraining from associating at least one machine with the at least one safety input device, upon determining that there is an obstructed line of sight between the at least one safety input device and one or more of the machines, such that the at least one dissociated machine cannot be brought to a safe state by means of the at least one safety input device. In this way, only machines that are in sight of an operator of the safety input device will potentially be associated with the safety input device. The line of sight between a safety device and a machine may for example be obstructed by a wall or other fixed installation.

According to one variant, each machine comprises at least one output function for activating a safe state of the machine, the industrial system comprises at least one logic device having a logic function, and the at least one safety input device comprises an input function. In this case, the method may further comprise continuously or repeatedly ensuring that each output function belongs to a logic sequence comprising a logic function and an input function for activating the output function by means of the logic function. The method according to this variant addresses the problem of constructing logic sequences in a mobile environment where positions of one or more machines and/or one or more safety input devices changes over time. The logic device may for example be a safety PLC (programmable logic controller). The at least one logic device may be provided in a central control system, in one or more or the safety input devices and/or in one or more of the machines.

Since one or more of the machines and the at least one safety input device can move in the working area, also the logic sequences become time dependent. The method ensures that the time dependent logic sequences are fulfilled for identified hazards in a mobile environment. By means of the method, the logic sequences are updated to handle the dynamics in the working area.

The logic sequences may be created in various ways. For example, the logic sequences may depend on distances between safety input devices and machines, the static layout of the working area, positions of one or more operators, and the dynamics of the working area, e.g. directions of movement and speed of safety input devices, operators and machines. Which safety input device(s) and which machines to be included in particular logic sequences may also depend on various risk assessments in the working area.

An emergency stop is one example of an input function. There are however several alternative input functions that may be activated by an operator to send information to a logic function, and further to an output function with the purpose of bringing the machine to a safe state.

One or more of the at least one safety input device may be movable to different positions in the working area. In this case, the method may further comprise continuously or repeatedly determining a position of the at least one safety input device in the working area. In some working areas, it may be difficult for an operator to access a stationary safety input device. By means of one or more mobile safety input devices according to the present disclosure, the safety in the working area can be improved.

One or more of the machines is movable to different positions in the working area. The method may further comprise continuously or repeatedly determining a position of the movable machines in the working area.

The method may further comprise providing an indication to an operator in the working area, the indication indicating which of the machines is currently associated with the at least one safety input device. The indication may for example be a light indication of the same type both from the safety input device and each machine associated with the safety input device. For example, a light indication of a particular color may be issued from the safety input device and from each machine currently associated with the safety input device.

According to a further aspect, there is provided a control system for handling safety in a working area of an industrial system, wherein a plurality of machines are arranged to operate in the working area, at least one manually operable safety input device is provided in the working area, and one or more of the machines is mobile and movable to different positions in the working area, the control system comprising a data processing device and a memory having a computer program stored thereon, the computer program comprising program code which, when executed by the data processing device, causes the data processing device to perform the steps of determining whether one or more of the machines is in proximity to one or more of the at least one safety input device; and associating a plurality of machines with at least one safety input device upon determining that a plurality of the machines are in proximity to one or more of the at least one safety input device, such that the plurality of associated machines can be brought to a safe state by means of the at least one safety input device.

According to a further aspect, there is provided an industrial system comprising a working area; a plurality of machines arranged to operate in the working area; at least one safety input device provided in the working area; and a control system according to the present disclosure;

wherein one or more of the machines is mobile and movable to different positions in the working area. The industrial system may be of any type according to the present disclosure.

The industrial system may comprise at least one logic device having a logic function; wherein each machine comprises at least one output function for activating a safe state of the machine; wherein the at least one safety input device comprises an input function; and wherein the control system is configured to continuously or repeatedly ensure that each output function belongs to a logic sequence comprising a logic function and an input function for activating the output function by means of the input function. The at least one logic device may be provided in the control system, in one or more of the machines, in one or more of the safety input devices and/or elsewhere in the industrial system.

The at least one safety input device may comprise an emergency stop. Alternatively, or in addition, the industrial system may further comprise at least one indication device configured to output an indication on which of the at least one machine is currently associated with the at least one safety input device. The at least one indication device may be provided on each safety input device and/or on each machine.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
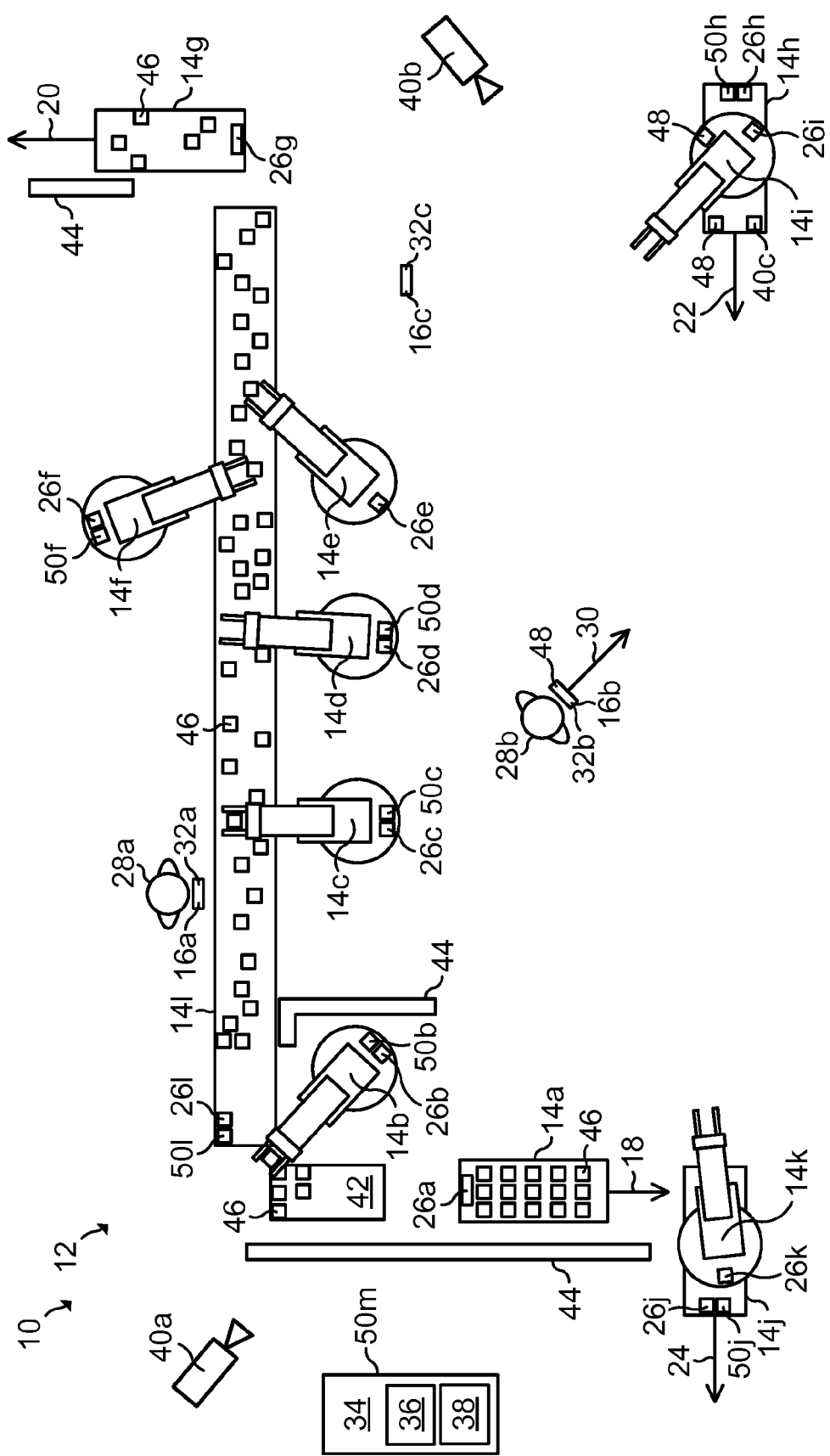
FIG. 1: schematically represents a top view of an industrial system in a first state.

In the following, a method of handling safety in a working area of an industrial system, a control system for handling safety in a working area of an industrial system, and an industrial system comprising a control system, will be described. The same reference numerals will be used to denote the same or similar structural features.

FIG. 1 schematically represents a top view of an industrial system 10 in a first state. The industrial system 10 comprises a working area 12, a plurality of machines 14a-14l in the working area 12 and a plurality of safety input devices 16a-16c in the working area 12 (each machine 14a-14l may also be referred to with reference numeral "14" and each safety input device 16a-16c may also be referred to with reference numeral "16"). The machines 14b, 14c, 14d, 14e, 14f, 14i, and 14k are exemplified as industrial robots each having a manipulator programmable in three or more axes. The machines 14a, 14g, 14h, and 14j are exemplified as AGVs. The machine 14l is exemplified as a conveyor.

The machines 14a, 14g, 14h, 14i, 14j, and 14k are mobile and the machines 14b, 14c, 14d, 14e, 14f, and 14l are stationary. The machine 14i is mobile due to being carried by the mobile machine 14h and the machine 14k is mobile due to being carried by the mobile machine 14j. The machine 14a moves downwards in FIG. 1 as indicated by arrow 18, the machine 14g moves upwards in FIG. 1 as indicated by arrow 20, the machines 14h and 14i move to the left in FIG. 1 as indicated by arrow 22 and the machines 14j and 14k move to the left as indicated by arrow 24. Since the machines 14a, 14g, 14h, 14i, 14j, and 14k can move around in the working area 12, the industrial system 10 may be said to have spatial flexibility. All machines 14, both mobile and stationary, constitute hazards for humans close to the machines 14.

Each machine 14 comprises a safety function in the form of an output function 26a-26l (the output functions 26a-26l may also be referred to with reference numeral "26"). When the output function 26 of a machine 14 is activated, the machine 14 is brought to a safe state, for example by turning off the power to motors and engaging brakes. The output function 26 may override existing safety functions of the machine 14 or may function as a complement to existing safety functions of the machine 14.

The safety input devices 16a and 16b are mobile and carried by operator 28a and operator 28b, respectively (each operator 28a and 28b may also be referred to with reference numeral "28"). In FIG. 1, the operator 28b and the safety input device 16b move downwards to the right in FIG. 1 as indicated by arrow 30. The safety input device 16c is stationary.

In this example, the safety input devices 16a and 16b are mobile emergency stops arranged in a respective portable teach pendant unit (TPU) and the safety input device 16c is a stationary emergency stop. Each safety input device 16a, 16b, and 16c provides a safety function in the form of an input function 32a, 32b, and 32c (the input functions 32a, 32b, and 32c may also be referred to with reference numeral "32").

In this example, the input function 32 thus comprises activation of an emergency stop of the respective safety input device 16. However, alternative or additional input functions 32 are possible. For example, the input functions 32a and 32b of the movable safety input devices 16a and 16b may also comprise triggering of a dead man's switch, or a warning signal issued if an operator 16a and 16b fails to respond to a periodic test pulse.

The industrial system 10 further comprises a control system 34. The control system 34 may control some or more operations of the machines 14 and the safety input devices 16. The control system 34 comprises a data processing device 36 and a memory 38. A computer program is stored in the memory 38. The computer program comprises program code which, when executed by the data processing device 36 causes the data processing device 36 to perform, or command performance of, at least some of the steps as described herein. The control system 34 may be remote from the working area 12, for example provided in a remote server room. The control system 34 may communicate wirelessly with the respective machines 14 and the respective safety input devices 16.

The industrial system 10 further comprises a plurality of sensors 40a-40c (the sensors 40a-40c may also be referred to with reference numeral "40"). The sensors 40a and 40b are in this example stationary cameras for monitoring the entire working area 12. The working area 12 thereby constitutes a supervision zone in which positions of at least the movable machines 14 and the movable safety input devices 16 are monitored. The sensor 40c is a FLIR camera provided on the movable machine 14h. The control system 34 is configured to determine positions and movement speeds of the machines 14, the operators 28 and the safety input devices 16, for example based on images received from the sensors 40a, 40b, and 40c. The sensors 40a, 40b, and 40c may thus be in signal communication with the control system 34.

The industrial system 10 in FIG. 1 further comprises a stationary table 42 and a plurality of walls 44. The industrial system 10 is arranged to handle objects 46 by means of the machines 14. In the example in FIG. 1, each of the safety input device 16b, the machine 14h, and the machine 14i is illustrated to comprise an indication device 48. Each machine 14 and each safety input device 16 of the industrial system 10 may be provided with such indication device 48. Alternatively, or in addition, the one or more indication devices 48 may be stationary arranged in the working area 12.

The industrial system 10 is configured to continuously or repeatedly determine whether one or more of the machines 14 is in proximity to any of the safety input devices 16. Whether a machine 14 is in proximity to a safety input device 16 may be determined based on a distance between the machine 14 and the safety input device 16. This distance may however vary in various ways. For example, a larger distance may be used for the stationary safety input device 16c and a smaller distance may be used for the mobile safety input devices 16a and 16b. Thus, in FIG. 1, it may for example be determined that all machines 14 in the working area 12 are in proximity to the safety input device 16c, that only the machines 14b, 14c, 14d, and 14l are in proximity to the safety input device 16a, and that only the machines 14c, 14d, and 14e are in proximity to the safety input device 16b. Based on these proximity determinations, the machines 14a-14l are associated with the safety input device 16c such that each machine 14a-14l can be brought to a safe state by means of the safety input device 16c, the machines 14b, 14c, 14d, and 14l are associated with the safety input device 16a such that each machine 14b, 14c, 14d, and 14l can be brought to a safe state by means of the safety input device 16a, and the machines 14c, 14d, and 14e are associated with the safety input device 16b such that each machine 14c, 14d, and 14e can be brought to a safe state by means of the safety input device 16b.

In the example in FIG. 1, the stationary safety input device 16c is thus associated with movable machines 14a, 14g, 14h, 14i, 14j, and 14k in the working area 12 in contrast to many stationary emergency stops according to the prior art. Although the machine 14a may be determined to be in proximity to the safety input device 16a, there is a wall 44 between the machine 14a and the safety input device 16a. Since there is an obstructed line of sight between the safety input device 16a and the machine 14a due to the wall 44, the safety input device 16a may not be associated with the machine 14a. The positions of the walls 44 in the working area 12 may for example be determined by the control system 34 based on image data from the sensors 40a and 40b.

The industrial system 10 further comprises at least one logic function 50. In this example, the industrial system 10 comprises a plurality of logic functions 50. A logic function 50 may for example be provided in one or more machines 14, such as in a safety PLC thereof, in the control system 34 and/or in a central server.

In FIG. 1, the machines 14b-14d comprise respective logic functions 50b-50d, the machine 14f comprises a logic function 50f, the machine 14h comprises a logic function 50h, the machine 14j comprises a logic function 50j, the machine 14l comprises a logic function 50l and the control system 34 comprises a logic function 50m (the logic functions 50b-50d, 50f, 50h, 50j, 50l and 50m may also be referred to with reference numeral "50"). The reason that for example each of the machines 14b-14d, and 14f comprises a respective logic function 50b-50d, and 50f but the machine 14e does not, may be that the machines 14b-14d, and 14f come from a different supplier than the machine 14e. Thus, the machines 14b-14d, and 14f may be delivered with logic functions 50b-50d, and 50f grouped with respective output functions 26b-26d, and 26f.

In case the operator 28a activates the input function 32a of the safety input device 16a, the input command will be sent to all logic functions 50 of logic sequences having output functions 26 associated with the input function 32a. In FIG. 1, the input command will be sent to the respective logic functions 50b-50d, and 50l of the machines 14b-14d, and 14l and each machine 14b-14d, and 14l will thereby be brought to a safe state. One example of a logic sequence thus comprises activation of the input function 32a (e.g. when the operator 28a presses an emergency button on the safety input device 16a), sending information regarding activation of the input function 32a to the logic functions 50b-50d, and 50l, and activation of the output functions 26b-26d, and 26l by the logic functions 50b-50d, and 50l to bring the machines 14b-14d, 14l to their respective safe states.

In case the operator 28b activates the input function 32b of the safety input device 16b, the input command will be sent to all logic functions 50 of logic sequences having output functions 26 associated with the input function 32b. In FIG. 1, the input command will be sent to the respective logic functions 50c and 50d of the machines 14c and 14d and to the logic function 50m of the control system 34. Since the logic function 50c belongs to a logic sequence comprising the output function 26c, the logic function 50d belongs to a logic sequence comprising the output function 26d, and the logic function 50m belongs to a logic sequence comprising the output function 26e, each machine 14c-14e will thereby be brought to a safe state.

In case an operator 28 activates the input function 32c of the stationary safety input device 16c, the input command will be sent to all logic functions 50 of logic sequences having output functions 26 associated with the input function 32c. Thereby, all machines 14 in the working area 12 will be brought to a safe state.

Since for example the machine 14a does not comprise any logic function "onboard", the input function 32c may be processed by the logic function 50m of the control system 34 and the logic function 50m may in turn activate the output function 26a of the machine 14a in order to bring the machine 14a to a safe state. Thus, not all input commands need to be processed in the working area 12.

The control system 34 may regularly diagnose the functionality of the sensors 40a and 40b. The sensor 40c may for example be diagnosed by the logic function 50h of the machine 14h.

The industrial system 10 in FIG. 1 may be said to comprise a plurality of safety systems. Each safety system may be divided in three safety functions comprising an input function 32, a logic function 50 and an output function 26. When an input function 32 is activated, the information is transferred to a logic function 50. The logic function 50 will then transfer information to one or more output functions 26. As a result, the identified hazard is to decease. Thus, a logic sequence of an input function 32, a logic function 50 and an output function 26 will bring the machine 14 to a safe state. The number and location of the logic functions 50 may vary as long as each output function 26 belongs to a logic sequence comprising a logic function 50 and an input function 32 for activating the output function 26 by means of the logic function 50. One challenge with a working area 12 of the type FIG. 1, which constitutes a mobile environment, is to construct appropriate logic sequences when one or more positions of the input functions 32 and/or one or more positions of the output functions 26 change over time.

The three safety functions (the input function 32, the logic function 50 and the output function 26) to form a minimum safety system can be grouped together or be standalone. For example, an input function 32 can be grouped with a logic function 50 and/or an output function 26, the logic function 50 can be grouped with the output function 26, and/or the input function 32, the logic function 50 and the output function 26 can be grouped. The relationships between the input functions 32, the logic functions 50 and the output functions 26 may need to be considered in order to provide a safe working area 12. Within the working area 12 of the industrial system 10, where no fences or similar restrictions are provided for the machines 14, and where operators 28 and the machines 14 are mobile relative to each other, it may not be feasible to have static logic sequences comprising an input function 32, a logic function 50 and an output function 26.

There are often many instances of the minimum safety system for one or more machines 14. Thus, for an industrial system 10 comprising a plurality of machines 14, there may be a large number of minimum safety systems to be handled. For example, the input function 32a and the output function 26a may belong to different logic sequences. The input function 32a may belong to logic sequences comprising the logic functions 50b-50d, and 50l and the output functions 26b-26d, and 26l. The output function 26a of the machine 14a may belong to a logic sequence comprising the input function 32c of the safety input device 16c and the logic function 50m of the control system 34. The logic sequences are continuously or repeatedly updated to include or exclude various safety input devices 16 and machines 14 in order to handle the dynamics of the industrial system 10.

As the operator 28b moves in the direction of arrow 30 and the machines 14h and 14i move in the direction of arrow 22, the distance between the operator 28b and the machines 14h and 14i will reduce and the operator 28b will eventually be in a determined proximity to the machines 14h and 14i. The machines 14h and 14i may be evaluated as a potential hazard for the operator 28b, for example by means of a risk analysis carried out in the control system 34. The mitigation of the identified hazard is to bring the moving machines 14h and 14i to a safe state, for example a full stop of the moving machines 14h and 14i.

In FIG. 1, it may be determined that the safety input device 16b will be in proximity to the machines 14h and 14i within a certain time limit and the safety input device 16b may optionally be associated with the machines 14h and 14i before being in proximity to the machines 14h and 14i. A similar "early association", i.e. before the safety input device 16b is in proximity to the machines 14h and 14i, may be made based on a relative speed between the safety input device 16b and the machines 14h and 14i.

Figure 2:
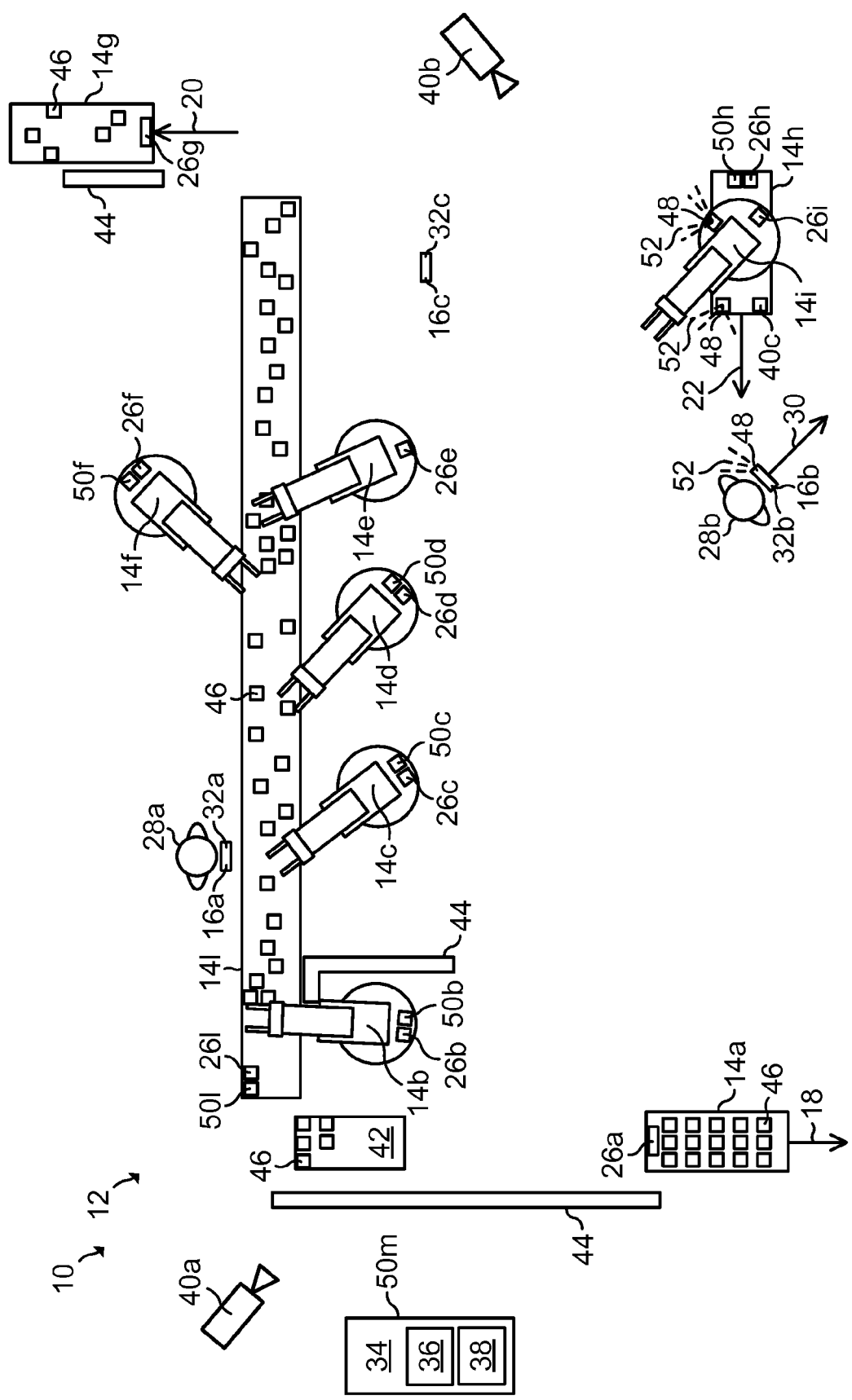
FIG. 2: schematically represents a top view of the industrial system in FIG. 1 in a second state.

FIG. 2 schematically represents a top view of the industrial system 10 in FIG. 1 when adopting a second state, a certain time limit after adopting the first state in FIG. 1. In FIG. 2, the operator 28b has moved out from the hazard zones of the machines 14c-14e. Since the operator 28b is no longer in proximity to the machines 14c-14e, the safety input device 16b is dissociated from the machines 14c-14e. However, the operator 28b is now in proximity to the machines 14h and 14i and the safety input device 16b is now associated with the machines 14h and 14i. Thus, based on the relative positions of the safety input device 16b and the machines 14, different sets of machines 14 can be brought to their respective safe state by means of the safety input device 16b. That is, the spans of control of the safety input devices 16 are varied dynamically in the working area 12.

Furthermore, in the state of the industrial system 10 in FIG. 2, the machines 14j and 14k have left the working area 12. The machines 14j and 14k may therefore be dissociated from the safety input device 16c and instead be associated with one or more safety input devices in a neighboring working area (not shown).

In FIG. 2, the input function 32b of the safety input device 16b is disconnected from the logic sequences comprising the logic functions 50c, 50d, and 50m and the output functions 26c-26e, and is now connected to the logic sequence comprising the logic function 50h and the output functions 26h and 26i. The output functions 26c-26e still belong to at least one logic sequence. That is, the output functions 26c-26e belong to the logic sequences comprising the input function 32c and the output functions 26c and 26d belong to the logic sequences comprising the input function 32a.

When the safety input device 16b becomes associated with the machines 14h and 14i, each indication device 48 of the safety input device 16b and the machines 14h and 14i issues an indication 52. In FIG. 2, the indications 52 are exemplified as blinking lights of the same color, for example a non-red color. The operator 28b can thereby clearly see that the two machines 14h and 14i are currently associated with the safety input device 16b and will thereby know that each machine 14h and 14i can be brought to a safe state by activating the safety input device 16b.

The operator 28b holding the mobile safety input device 16b can thus walk into proximity of the moving machines 14h and 14i such that the mobile safety input device 16b becomes associated with the moving machines 14h and 14i. The operator 28b can then walk next to the moving machines 14h and 14i and have the possibility to bring the machines 14h and 14i to a safe state at any time. When the operator 28b (holding the safety input device 16b) walks away from the moving machines 14h and 14i, the safety input device 16b is dissociated from the machines 14h and 14i.

While the present disclosure has been described with reference to exemplary embodiments, it will be appreciated that the present invention is not limited to what has been described above. For example, it will be appreciated that the dimensions of the parts may be varied as needed.

The invention claimed is:

1. A method of handling safety in a working area of an industrial system, wherein a plurality of machines are arranged to operate in the working area, at least one manually operable safety input device is provided in the working area, and one or more of the machines is mobile and movable to different positions in the working area, the method comprising:
continuously or repeatedly determining whether one or more of the machines is in proximity to one or more of the at least one safety input device; and
associating a plurality of machines with at least one safety input device upon determining that a plurality of the machines are in proximity to one or more of the at least one safety input device, such that the plurality of associated machines can be brought to a safe state by means of the at least one safety input device.

2. The method according to claim 1, further comprising:
estimating whether one or more of the machines will be in proximity to the at least one safety input device within a time limit; and
associating at least one machine, that will be in proximity to the at least one safety input device within the time limit, with the at least one safety input device, such that the at least one associated machine can be brought to a safe state by means of the at least one safety input device.

3. The method according to claim 2, wherein the estimation is based on a relative speed between the at least one machine and the at least one safety input device.

4. The method according to claim 2, further comprising:
determining whether at least one of the associated machines is no longer in proximity to the at least one safety input device; and
dissociating the at least one associated machine from the at least one safety input device upon determining that at least one of the associated machines is no longer in proximity to the at least one safety input device, such that the at least one dissociated machine can no longer be brought to a safe state by means of the at least one safety input device.

5. The method according to claim 2, further comprising:
determining whether there is an obstructed line of sight between the at least one safety input device and one or more of the machines; and
dissociating at least one associated machine from the at least one safety input device, or refraining from associating at least one machine with the at least one safety input device, upon determining that there is an obstructed line of sight between the at least one safety input device and one or more of the machines, such that the at least one dissociated machine cannot be brought to a safe state by means of the at least one safety input device.

6. The method according to claim 2, wherein each machine comprises at least one output function for activating a safe state of the machine, the industrial system includes at least one logic device having a logic function, and the at least one safety input device includes an input function; and wherein the method further comprises:
continuously or repeatedly ensuring that each output function belongs to a logic sequence including a logic function and an input function for activating the output function by means of the logic function.

7. The method according to claim 1, further comprising:
determining whether at least one of the associated machines is no longer in proximity to the at least one safety input device; and
dissociating the at least one associated machine from the at least one safety input device upon determining that at least one of the associated machines is no longer in proximity to the at least one safety input device, such that the at least one dissociated machine can no longer be brought to a safe state by means of the at least one safety input device.

8. The method according to claim 1, further comprising:
determining whether there is an obstructed line of sight between the at least one safety input device and one or more of the machines; and
dissociating at least one associated machine from the at least one safety input device, or refraining from associating at least one machine with the at least one safety input device, upon determining that there is an obstructed line of sight between the at least one safety input device and one or more of the machines, such that the at least one dissociated machine cannot be brought to a safe state by means of the at least one safety input device.

9. The method according to claim 1, wherein each machine comprises at least one output function for activating a safe state of the machine, the industrial system includes at least one logic device having a logic function, and the at least one safety input device includes an input function; and wherein the method further comprises:

continuously or repeatedly ensuring that each output function belongs to a logic sequence including a logic function and an input function for activating the output function by means of the logic function.

10. The method according to claim 1, wherein one or more of the at least one safety input device is movable to different positions in the working area.

11. The method according to claim 1, further comprising providing an indication to an operator in the working area, the indication indicating which of the machines is currently associated with the at least one safety input device.

12. A control system for handling safety in a working area of an industrial system, wherein a plurality of machines are arranged to operate in the working area, at least one manually operable safety input device is provided in the working area, and one or more of the machines is mobile and movable to different positions in the working area, the control system comprising a data processing device and a memory having a computer program stored thereon, the computer program including program code which, when executed by the data processing device, causes the data processing device to perform the steps of:

determining whether one or more of the machines is in proximity to one or more of the at least one safety input device;

wherein the computer program comprises program code which, when executed by the data processing device, causes the data processing device to perform the step of:

associating a plurality of machines with at least one safety input device upon determining that a plurality of the machines are in proximity to one or more of the at least one safety input device, such that the plurality of associated machines can be brought to a safe state by means of the at least one safety input device.

13. An industrial system comprising:
a working area;
a plurality of machines arranged to operate in the working area;
at least one safety input device provided in the working area; and
a control system according to claim 12;
wherein one or more of the machines is mobile and movable to different positions in the working area.

14. The industrial system according to claim 13, further comprising at least one logic device having a logic function; wherein each machine comprises at least one output function for activating a safe state of the machine; wherein the at least one safety input device includes an input function; and wherein the control system is configured to continuously or repeatedly ensure that each output function belongs to a logic sequence including a logic function and an input function for activating the output function by means of the input function.

15. The industrial system according to claim 13, wherein the at least one safety input device comprises an emergency stop.

16. The industrial system according to claim 13, further comprising at least one indication device configured to output an indication on which of the at least one machine is currently associated with the at least one safety input device.

17. The industrial system according to claim 16, wherein the at least one indication device is provided on each safety input device and/or on each machine.

\* \* \* \* \*